US012587431B2

(12) United States Patent
Krivopalov et al.

(10) Patent No.: US 12,587,431 B2
(45) Date of Patent: Mar. 24, 2026

(54) SYSTEM PERFORMANCE DEGRADATION MITIGATION BASED ON DIFFERENT COMPUTE RESOURCE CHARACTERISTICS

(71) Applicant: ROKU, INC., San Jose, CA (US)

(72) Inventors: Vladimir Krivopalov, Matthews, NC (US); Don Ma, San Jose, CA (US); Jinyoung Jeon, San Jose, CA (US); Shaokang Tan, Saratoga, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/226,070

(22) Filed: Jul. 25, 2023

(65) Prior Publication Data

US 2025/0039035 A1     Jan. 30, 2025

(51) Int. Cl.
*H04L 41/06* (2022.01)
*G06F 9/54* (2006.01)

(52) U.S. Cl.
CPC .............. *H04L 41/06* (2013.01); *G06F 9/547* (2013.01)

(58) Field of Classification Search
CPC ................................. H04L 41/06; G06F 9/547
See application file for complete search history.

(56) References Cited

U.S. PATENT DOCUMENTS

| | | | | |
|---|---|---|---|---|
| 2015/0347181 A1* | 12/2015 | Myrick | ................... | G06F 11/34 |
| | | | | 718/102 |
| 2016/0188324 A1* | 6/2016 | Sankaranarasimhan | ..................... | |
| | | | | G06F 21/6227 |
| | | | | 717/121 |
| 2019/0052575 A1* | 2/2019 | Kaminski | ............... | H04L 47/83 |
| 2019/0108088 A1* | 4/2019 | Marr | ................... | G06F 11/3433 |
| 2020/0371892 A1* | 11/2020 | Huang | ................... | G06N 20/00 |
| 2022/0100636 A1* | 3/2022 | Jothiprakash | ....... | G06F 11/3612 |
| 2024/0378088 A1* | 11/2024 | Govindan | ............. | G06F 9/5072 |

* cited by examiner

*Primary Examiner* — Glenton B Burgess
*Assistant Examiner* — Patrick F Ngankam
(74) *Attorney, Agent, or Firm* — STERNE, KESSLER, GOLDSTEIN & FOX P.L.L.C

(57) ABSTRACT

Disclosed herein are system, apparatus, article of manufacture, method and/or computer program product embodiments, and/or combinations and sub-combinations thereof, for mitigating performance degradation of a computing device. In an embodiment, a notification indicative of a characteristic of a compute resource of the device is received. The notification is of a first type of a plurality of types of notifications, and each type of notification of the types of notifications is indicative of a different characteristic of the compute resource. A level of performance degradation, from levels of performance degradation, of the computing device is determined based on a mapping that maps each type of notification of the types of notifications to a corresponding level of performance degradation of the different levels of performance degradation. An action from a plurality of different actions configured to mitigate the performance degradation is performed based on the determined level of performance degradation.

20 Claims, 6 Drawing Sheets

400

| Severity Level | Notification Type | Threshold | Mitigating Action(s) |
|---|---|---|---|
| 402 | 404 | 406 | 408 |
| 1 | Available Memory | 64MB | Call callback function(s) of OS component(s) to free memory resources thereof |
| 2 | Available Memory | 48MB | Decompile Add-Ons (or Other Components of Background/Foreground Application(s)) |
| 3 | Task Delay | 100ms out of 1 second | Terminate Background Application(s) |
| 4 | Task Delay | 300ms out of 1 second | Terminate Foreground Application(s) |

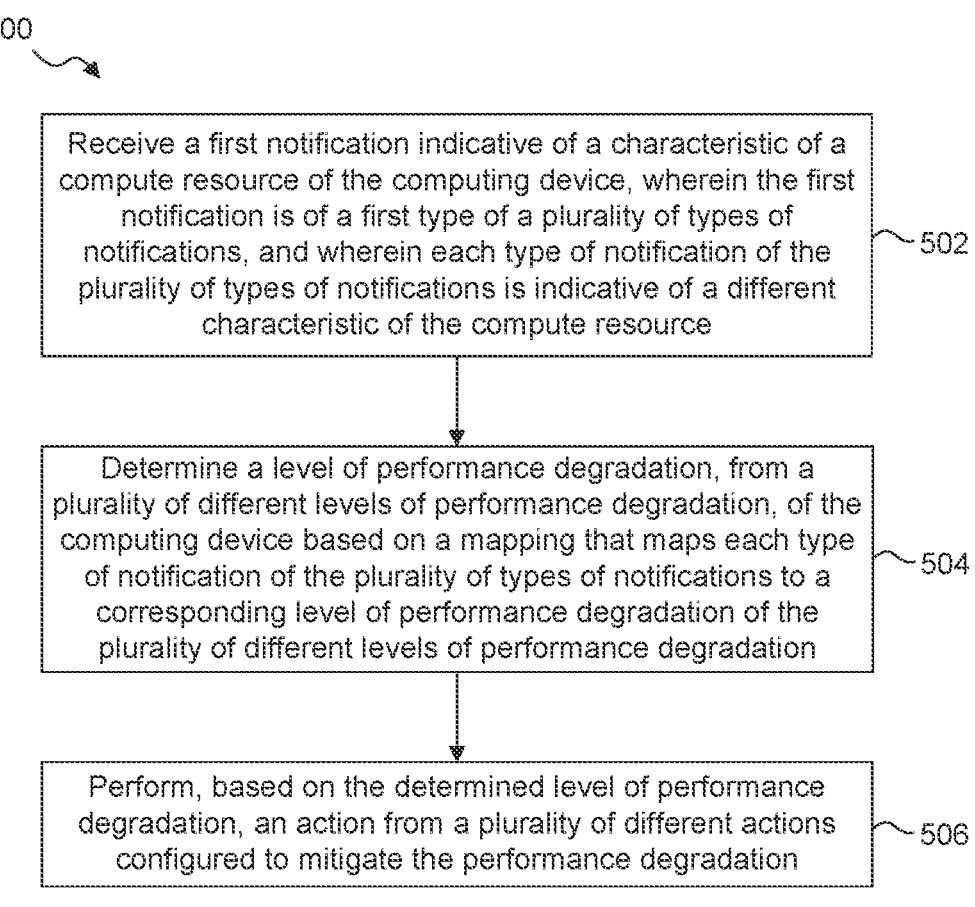

Receive a first notification indicative of a characteristic of a compute resource of the computing device, wherein the first notification is of a first type of a plurality of types of notifications, and wherein each type of notification of the plurality of types of notifications is indicative of a different characteristic of the compute resource ~502

Determine a level of performance degradation, from a plurality of different levels of performance degradation, of the computing device based on a mapping that maps each type of notification of the plurality of types of notifications to a corresponding level of performance degradation of the plurality of different levels of performance degradation ~504

Perform, based on the determined level of performance degradation, an action from a plurality of different actions configured to mitigate the performance degradation ~506

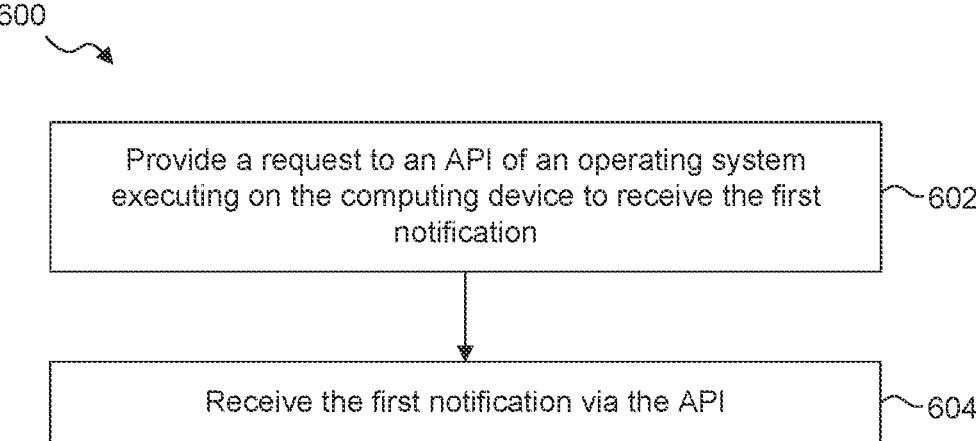

Provide a request to an API of an operating system executing on the computing device to receive the first notification ~602

Receive the first notification via the API ~604

FIG. 6

SYSTEM PERFORMANCE DEGRADATION MITIGATION BASED ON DIFFERENT COMPUTE RESOURCE CHARACTERISTICS

BACKGROUND

Field

This disclosure is generally directed to techniques for mitigating performance degradation of a media device.

SUMMARY

Provided herein are system, apparatus, device, method and/or computer program product embodiments, and/or combinations and sub-combinations thereof, for mitigating performance degradation of a computing device. In an embodiment, a first notification indicative of a characteristic of a compute resource of the computing device is received. The first notification is of a first type of a plurality of types of notifications, and each type of notification of the plurality of types of notifications is indicative of a different characteristic of the compute resource. A level of performance degradation, from a plurality of different levels of performance degradation, of the computing device is determined based on a mapping that maps each type of notification of the plurality of types of notifications to a corresponding level of performance degradation of the plurality of different levels of performance degradation. An action from a plurality of different actions configured to mitigate the performance degradation is performed based on the determined level of performance degradation.

In an embodiment, the action comprises at least one of causing a second notification indicative of the determined level of performance degradation to be provided to an application or service of an operating system executing on the computing device, causing at least one add-on installed on the computing device to be decompiled, or causing at least one of a background application executing on the computing device or a foreground application executing on the computing device to be terminated.

In another embodiment, causing the second notification to be provided to the application or service of the operating system comprises calling a callback function of the application or service that is registered with a first handler function, wherein the callback function is configured to provide the second notification to the application or service of the operating system, causing at least one add-on installed on the computing device to be decompiled comprises providing a third notification to a second handler function communicatively coupled to a decompiler, the third notification causing the second handler function to instruct the decompiler to decompile the at least one add-on, and causing at least one of the background application executing on the computing device or the foreground application executing on the computing device to be terminated comprises providing a fourth notification to a third handler function communicatively coupled to the operating system, the fourth notification causing the third handler function to instruct the operating system to terminate at least one of the background application or the foreground application.

In yet another embodiment, the mapping further maps the plurality of different levels of performance degradation to the plurality of different actions.

In still another embodiment, receiving the first notification comprises providing a request to an application programming interface (API) of an operating system executing on the computing device to receive the first notification, and receiving the first notification via the API.

In a further embodiment, the compute resource comprises at least one of at least one memory of the computing device, at least one processor of the computing device, at least one network to which the computing device is communicatively coupled, or at least one storage device of the computing device.

In yet a further embodiment, the characteristic of the compute resource comprises at least one of an available amount of the at least one memory, a percentage of time tasks are delayed based on memory allocation time of the at least one memory, a first measure of processing usage of the at least one processor, a second measure of network usage associated with the at least one network, or a third measure of utilization of the at least one storage device.

BRIEF DESCRIPTION OF THE FIGURES

The accompanying drawings are incorporated herein and form a part of the specification.

FIG. 4 illustrates a data structure representative of a mapping according to some embodiments.

FIG. 5 is a flowchart for a method for mitigating degradation mitigation of a computing device.

FIG. 6 is a flowchart for a method for receiving a notification indicative of a characteristic of a compute resource of the computing device, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
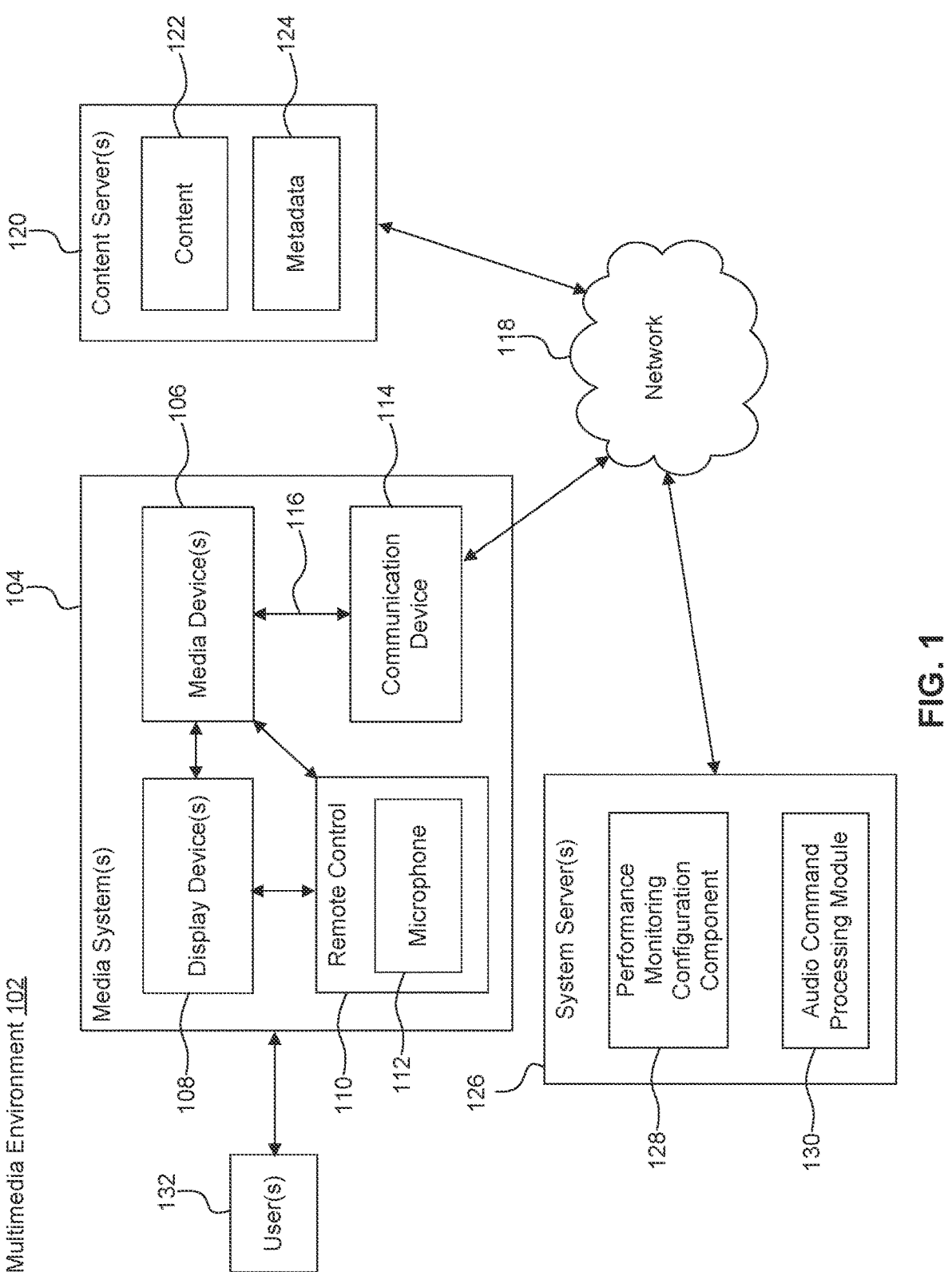
FIG. 1 illustrates a block diagram of a multimedia environment, according to some embodiments.

Compute resources of a digital system may be managed by tracking characteristics thereof, such as memory pressure, and taking timely actions to mitigate performance issues. Certain mechanisms rely on a particular condition to raise an event that there is some type of performance degradation. Such mechanisms rely on a single type of event (e.g., either an amount of available memory or an amount of delay to perform certain tasks (e.g., due to a lack of memory) reaching a particular threshold), which may not provide an accurate representation of the overall system performance. For instance, if only an amount of available memory is considered, degradation issues caused by a relatively high number of tasks being delayed due to a lack of memory may remain undetected, and vice versa. If such degradation issues remain unmitigated, system stability may suffer. For example, the severe shortage of memory may lead to increased central processing unit (CPU) utilization, delays (which may impact user experience), and system crashes.

Embodiments described herein may address some or all of the foregoing issues related to compute resource characteristic tracking approaches. For instance, a hybrid tracking approach may be utilized in which a plurality of different event types associated with different compute resource characteristics are tracked. The different event types may be mapped to different severity levels indicating the severity of the performance degradation of the system. Certain actions to mitigate the performance degradation may be performed based on the severity level.

For example, in embodiments, a notification indicative of a characteristic of a compute resource of the computing device is received. The notification is of a first type of a plurality of types of notifications, and each type of notification of the plurality of types of notifications is indicative of a different characteristic of the compute resource. A level of performance degradation, from a plurality of different levels of performance degradation, of the computing device is determined based on a mapping that maps each type of notification of the plurality of types of notifications to a corresponding level of performance degradation of the plurality of different levels of performance degradation. An action from a plurality of different actions configured to mitigate the performance degradation is performed based on the determined level of performance degradation.

By utilizing different event types to determine the severity of performance degradation, proper actions based on the determined severity may be performed to mitigate the degradation. Such actions include, but are not limited to, freeing memory (e.g., by terminating applications, decompiling certain components of such applications (e.g., add-ons, libraries, etc.), dropping (e.g., clearing) caches, etc.), CPU scaling, I/O throttling, etc. Such actions may improve the functioning and stability of the system, along with the user experience of a user utilizing the system, by preventing crashes, reboots, and user interface lagging.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The system servers 126 may include a degradation monitoring configuration component 128. Degradation monitoring configuration component 128 may be configured to provide a configuration for monitoring performance degradation to media device 106 over network 118. Media device 106 may be configured to implement the configuration during runtime thereof. Additional details regarding degradation monitoring configuration component 128 are described below.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
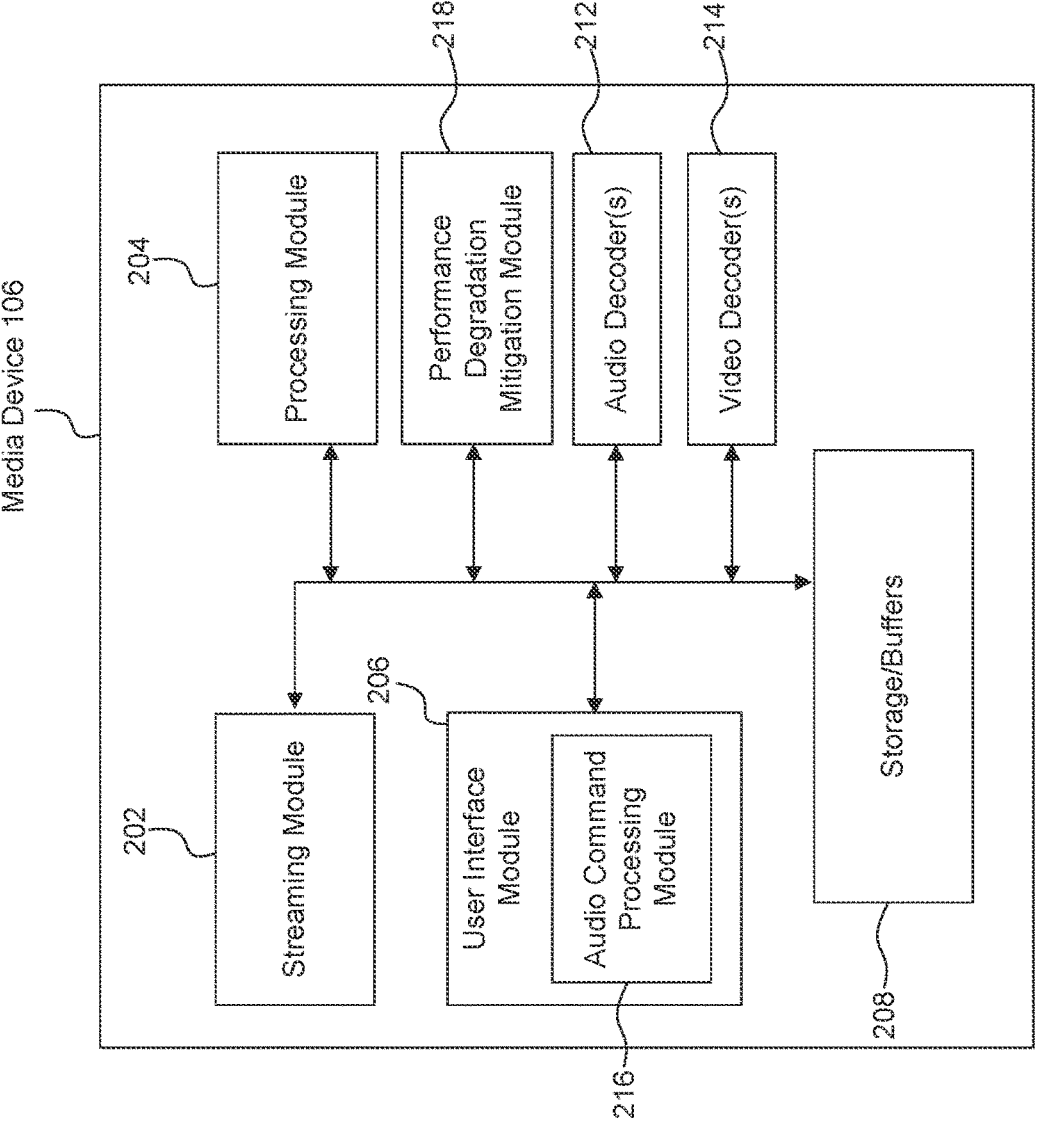
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

System Performance Mitigation Based on Different Compute Resource Characteristics As further show in FIG. 2, media device 106 may include a performance degradation mitigation module 218. Performance degradation mitigation module 218 may be configured to receive one or more notifications (or events) that respectively indicate a particular characteristic of a particular compute resource of media device 106. Each notification may be associated with a particular notification type, where each notification type is indicative of a different characteristic of a particular compute resource. Based on the notification(s), performance degradation mitigation module 218 may determine a level of performance degradation of media device 106. The level of performance degradation may be referred herein as a severity level. Based on the determined severity level, performance degradation mitigation module 218 may perform an action to mitigate the performance degradation.

Figure 3:
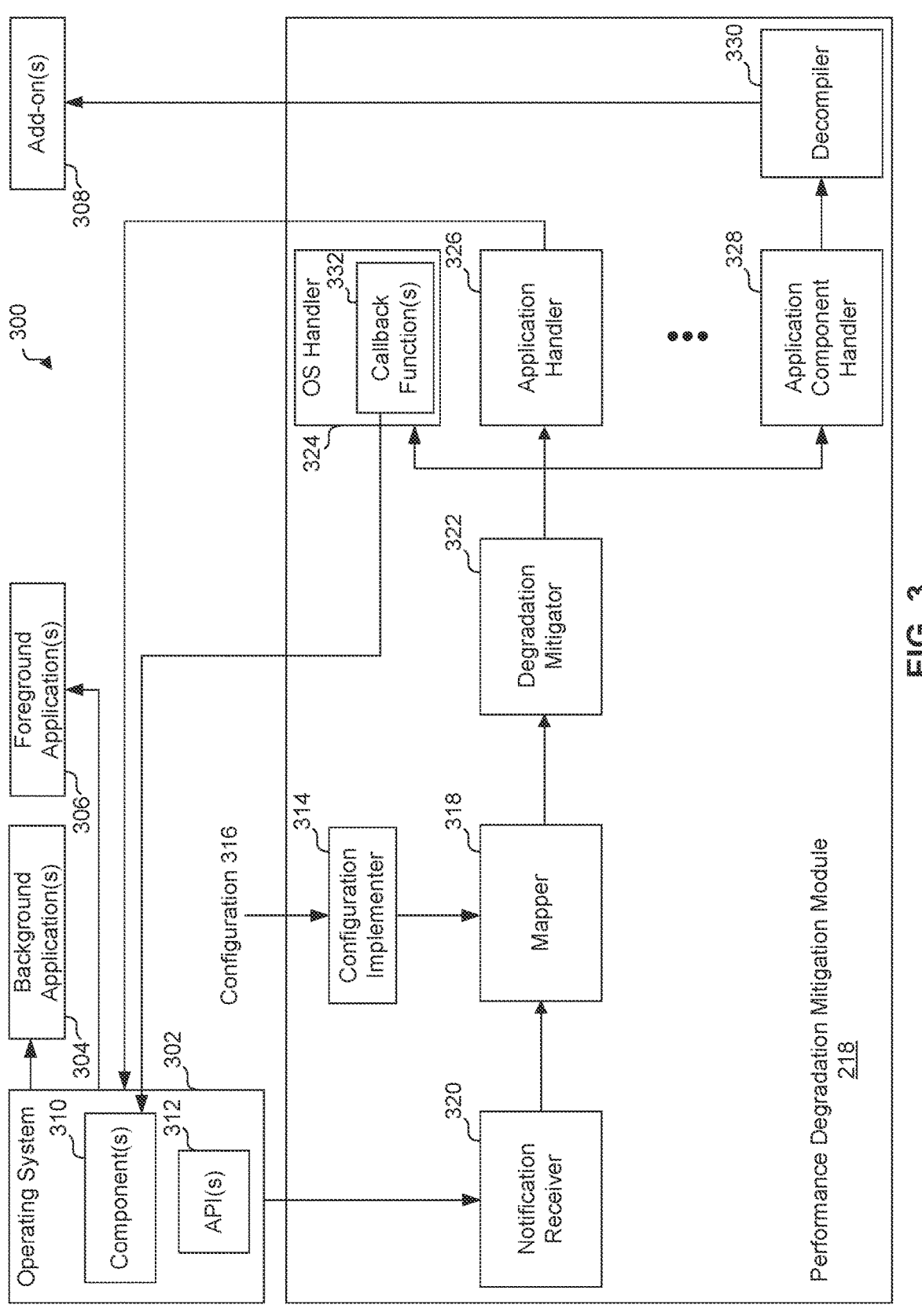
FIG. 3 illustrates a block diagram of a media device, according to some embodiments.

FIG. 3 illustrates a block diagram of a media device 300, according to some embodiments. Media device 300 is an example of media device 106, as described above with reference to FIG. 1. As shown in FIG. 3, media device 300 may comprise an operating system (OS) 302, one or more background applications 304, one or more foreground applications 306, one or more add-ons 308, and performance degradation mitigation module 218. Each of operating system (OS) 302, background application(s) 304, foreground application(s) 306, add-on(s) 308, and/or performance degradation mitigation module 218 may be stored in a memory (e.g., a main or primary memory) during execution thereof by one or more processors (e.g. CPUs). Processing module 204 may be an example of such processor(s). Examples of memory include, but are not limited to, a random access memory (RAM) (e.g., dynamic RAM (DRAM), synchronous DRAM (SDRAM), or dual-data rate RAM (DDR-RAM)).

Operating system 302 may manage one or more hardware components (e.g., processor(s), main memory, secondary memory (e.g., hard disk drives, removable storage devices, etc.)) and software executing on media device 300. Example hardware components are described in detail below in reference to FIG. 7. Examples of software include, but are not limited to, background application(s) 304, foreground application(s) 306, add-on(s) 308, and/or performance degradation mitigation module 218. Operating system 302 may comprise one or more components 310 and one or more application programming interfaces (API(s)) 312. Component(s) 310 may include applications, services, and/or utilities that perform various functions of OS 302. Such functions may include process management, input/output (I/O) device management, file management, network management, main memory management, secondary storage management, security management command interpreter system management, etc. API(s) 312 may be configured to provide notifications (or events) that respectively indicate a particular characteristic of a particular compute resource of media device 300. Performance degradation mitigation module 218 may be configured to register or subscribe to API(s) 312 to receive such notifications.

Examples of compute resources of media device 300 include, but are not limited to, processor(s) of the media device 300, one or more memories of media device 300, one or more networks to which media device 300 is communicatively coupled, one or more storage devices of media device 300, I/O associated with media device 300, etc. Examples of characteristics of such compute resources include, but are not limited to, a measure of processing usage of the processor(s) (e.g., a number of processing cycles of the processor(s) (i.e., CPU utilization)), an amount of free memory (e.g., an amount of memory available for allocation), an amount of time to allocate a portion of memory (e.g., for and/or by OS 310, background application(s) 304, foreground application(s) 306, add-on(s) 308, etc.), a measure of network usage associated with the network(s) (e.g., a number and/or type of network ports utilized for incoming and/or outgoing data packets received by and/or transmitted from media device 300, a number and/or type of network packets (e.g., SYN or ACK packets) transmitted from and/or received by media device 300, the size of the data packets, the time at which the data packets were transmitted and/or received, etc.), a measure of utilization of the storage device(s) (e.g., a number, size, and/or type of I/O operations to and/or from such storage device(s)), etc.) API(s) 312 may also provide notifications associated with other characteristics of media device 300, including, but not limited to, an amount of power consumed by media device 300, the temperature of media device 300, etc.

Each notification provided by API(s) 312 may be of a particular type. Each type of notification may be indicative of a different characteristic of a particular compute resource. For example, a first type of notification may be indicative of the amount of available memory, a second type of notification may be indicative of task(s) being delayed because of memory allocation time meeting or exceeding a predetermined threshold (e.g., due to memory shortage and/or fragmentation), a third type of notification may be indicative of CPU utilization, etc.

Background application(s) 304 may include any executing application that is not displayed to, not utilized by, and/or not interacted with by a user. Foreground application(s) 306 may include any executing application that is displayed to, utilized by, and/or interacted with by a user (e.g., via display device(s) 108). Examples of background application(s) 304 and foreground application(s) 306 include, but are not limited to, streaming applications, electronic programming guide applications, gaming applications, etc.

Add-on(s) 308 may be a software component that adds a particular feature to a host application (e.g., background application(s) 304 or foreground application(s) 306). The host application may provide services which add-on(s) 308 may use, including a way for add-on(s) 308 to register themselves with the host application and a protocol for the exchange of data between the host application and add-on(s) 308. Add-on(s) 308 may depend on the services provided by the host application and generally do not operate without the host application (whereas the host application operates independently of the add-on(s) 308). Add-on(s) 308 may be compiled and loaded into main memory when utilized by a particular host application.

Performance degradation mitigation module 218 may comprise a configuration implementer 314, a mapper 318, a notification receiver 320, a degradation mitigator 322, an OS handler 324, an application handler 326, an application component handler 328, and a decompiler 330. Each of OS handler 324, application handler 326, and application component handler 328 may be handler function configured to perform a particular operation upon receiving a notification (or event). Such operations and notifications are further described below. Each of the components of performance degradation mitigation module 218 may be implemented by processing logic that can comprise hardware (e.g., circuitry, dedicated logic, programmable logic, microcode, etc.), software (e.g., instructions executing on a processing device), or a combination thereof. Each of these components will now be described.

Mapper 318 may map a plurality of types of notifications to a plurality of different levels of performance degradation, for example, via a mapping such as a data structure (e.g., a table). Mapper 318 may also map a plurality of different levels of performance degradation to a plurality of different actions via the mapping. For example, FIG. 4 illustrates a data structure 400 representative of mapping according to some embodiments. As shown in FIG. 4, data structure 400 may comprise a plurality of columns 402, 404, 406, and 408. Column 402 may specify different levels of performance degradation. Column 404 may specify a notification type mapped to each of the different levels of performance degradation. For example, as shown in FIG. 4, a first notification type (e.g., an amount of memory available for allocation) may be mapped to severity levels 1 and 2, and a second notification type (e.g., a percentage of time tasks are delayed because of memory allocation time meeting or exceeding a predetermined threshold (e.g., due to memory shortage and fragmentation)) may be mapped to severity levels 3 and 4. Column 406 may specify, for each notification type, a condition (e.g., a threshold) for when a particular mitigation action is to be performed. Column 408 may specify one or more mitigation actions that may be performed when a corresponding threshold for a notification is met. For example, as shown in FIG. 4, when a notification of a first type indicating that 64 megabytes of memory is available for media device 300 is received, callback function(s) (e.g., callback function(s) 332) of OS components 310 may be called to free memory resources for each of OS components 310. When a notification of the first type indicating that 48 megabytes of memory is available for media device 300 is received, add-on(s) 308 (or other components (e.g., libraries) of background application(s) 304 and/or foreground application(s) 306) may be decompiled. When a notification of a second type indicating that certain tasks for media device 300 are delayed for 100 milliseconds out of 1 second, background application(s) 304 may be terminated. When a notification of the second type indicating that certain tasks for media device 300 are delayed for 300 milliseconds out of 1 second, foreground application(s) 306 may be terminated. It is noted that the severity levels, notification types, thresholds, and actions depicted in data structure 400 are purely exemplary and that data structure 400 may comprise any number of severity levels, where each severity level may be associated with a different notification type, threshold, and/or action(s) than shown in FIG. 4. It is further noted that a given severity level may be mapped to a plurality of different notification events types and/or thresholds. For example, a particular severity level may mapped to a first notification type (e.g., an amount of memory available for allocation) and a corresponding threshold of 64 megabytes, as well as being mapped to a second notification type (e.g., a percentage of tasks are delayed because of memory allocation time meeting or exceeding a predetermined threshold) and a corresponding threshold of 100 milliseconds out of 1 second. In such an example, a mitigating action may be performed if both of these events occur and their corresponding thresholds are met. It is also noted that data structures other than a table may be utilized to map a plurality of types of notifications to a plurality of different levels of performance degradation.

In some aspects, the mapping of data structure 400 may be configurable during runtime (e.g., execution) of performance degradation mitigation module 218. For example, referring again to FIG. 3, configuration implementer 314 may be configured to receive a configuration 316 for mapper 318. Configuration 316 may be provided by performance monitoring configuration component 128, as described above with reference to FIG. 1. Configuration 316 may comprise one or more parameters that specify a notification type, a threshold, and/or action(s) to be mapped to a particular severity level. The parameter(s) may be user-defined (e.g., by an administrator) or may be determined in an automated fashion. For instance, performance degradation mitigation module 218 may utilize machine learning-based techniques to determine a set of parameters for media device 300. For instance, performance monitoring configuration component 128 may comprise a machine learning model that analyzes historical data collected from a plurality of different media devices (e.g., media device 300). Such data may indicate notifications (or events) indicating characteristics of compute resources that were received by such media devices, along with information indicative of the behavior of such media devices in relation to such notifications (e.g., load times of applications, user engagement metrics with different applications or user interfaces, user interface response times, etc.). Based on such information, the machine learning model learns the severity of performance degradation in relation to the notifications and generates a classification for each of the notification event types. Each classification may correspond to a particular severity level. Performance monitoring configuration component 128 may be configured to determine a single classification for all types of media devices, a respective classification for each type of media device, and/or classifications that are specific to a particular media device associated with a particular user.

Configuration implementer 314 may be configured to provide the parameters to mapper 318, which updates its mapping based on the parameters. For instance, Mapper 318 may update its mapping based on the parameters of configuration 316 during runtime of performance degradation mitigation module 218. In some aspects, configuration 316 may comprise a configuration file that specifies the parameters for the mapping of mapper 318. The configuration file may be stored in a human-readable or machine-readable form.

Notification receiver 320 may be configured to receive notifications (or events) from API(s) 312. The notifications respectively indicate a particular characteristic of a particular compute resource of media device 300. As described above, each notification may be of a particular type, where each type of notification is indicative of a particular characteristic of a particular compute resource of media device 300. Notification receiver 320 may provide received notifications to mapper 318. Mapper 318 may be configured to receive, as an input, each notification provided by notification receiver 320 and provide, as an output, an indication of the determined severity level and/or an indication of action(s) to be performed to mitigate the performance degradation of media device 300. The indication of action(s) may be provided to degradation mitigator 322.

Degradation mitigator 322 may be configured to perform one or more actions to mitigate performance degradation of media device 300 based on the indication of the determined severity level and/or the indication of the action(s) received from mapper 318. For example, degradation mitigator 322 may cause a notification indicative of the determined severity level to be provided to OS component(s) 310. Based on the notification, OS component(s) 310 may determine whether data associated therewith is to be deleted, thereby freeing up memory of media device 300. For instance, certain OS component(s) 310 may be configured to cache and/or delete data (e.g., images, still pictures, text, graphics, advertisements, data objects, etc.) associated with background application(s) 304 and/or foreground application(s) 306. Such OS component(s) 310 may delete such data based on receiving the notification. In another example, degradation mitigator 322 may cause a notification to be provided to OS component(s) that instructs OS component(s) 310 to delete data associated therewith (i.e., the determination to delete such data is made by degradation mitigator 322 rather than OS component(s) 310 themselves). To provide such notifications to OS component(s) 310, OS handler 324 may call callback function(s) 332 of OS component(s) 310 that are registered with OS handler 324. Callback function(s) 332, when executed, may provide such notifications to OS component(s) 310. As described herein, callback function(s) 332 may be function(s) that are passed as an argument to another function and are executed after a particular operation has been completed.

In another example, degradation mitigator 322 may cause certain memory-consuming artifacts (e.g., data) produced by computations performed previously by media device 300 and that later can be restored through the same computations to be deleted from memory. In one example, degradation mitigator 322 may cause add-on(s) 308 (or other components of background application(s) 304 and/or foreground application(s) 306) to be decompiled and deleted from memory of media device 300 based on the indication of the determined severity level and/or the indication of the action(s) received from mapper 318. For example, degradation mitigator 322 may provide a notification to application component handler 328 that notifies application component handler 328 to decompile add-on(s) 330 (or other components of background application(s) 304 and/or foreground application(s) 306). Responsive to receiving the notification, application component handler 328 may provide a command to decompiler 330 to decompile add-on(s) 330 (or other components of background application(s) 304 and/or foreground application(s) 306), thereby freeing up memory of media device 300.

In a further example, degradation mitigator 322 may cause background application(s) 304 and/or foreground application(s) 306 to be terminated based on the indication of the determined severity level and/or the indication of the action(s) received from mapper 318. For instance, degradation mitigator 322 may provide a notification to application handler 326 to terminate background application(s) 304 and/or foreground application(s) 306. The notification may specify which of background application(s) 304 and/or foreground application(s) 306 that are to be terminated. Degradation mitigator 322 may determine which background application(s) 304 and/or foreground application(s) 306 are to be terminated based on the amount of memory consumed by such applications and/or usage frequency of such applications. Upon receiving such a notification, application handler 326 may provide a command to OS 310 to terminate the background application(s) 304 and/or foreground application(s) 306.

It is noted that while the handler functions described herein are configured to mitigate memory-related performance degradation, the embodiments described herein are not so limited. For instance, media device 300 may comprise any number and types of handler functions each configured to perform a particular operation to mitigate different types of performance degradation. For instance, media device 300 may comprise handler function(s) configured to mitigate other types of performance degradation mitigation (e.g., processor-related performance degradation, I/O-related performance degradation, temperature-related performance degradation, etc.). Such handler function(s) may cause OS 310 to scale down a number of processor cores of the processor(s) of media device 300 based on the indication of the determined severity level and/or the indication of the action(s) received from mapper 318, throttle I/O operations based on the indication of the determined severity level and/or the indication of the action(s) received from mapper 318, etc.

FIG. 5 is a flowchart for a method 500 for mitigating degradation mitigation of a computing device, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to media device 300 of FIG. 3, which is one example of a media device. However, method 500 is not limited to that example embodiment.

In 502, notification receiver 320 receives a first notification indicative of a characteristic of a compute resource of the computing device (e.g., media device 300), wherein the first notification is of a first type of a plurality of types of notifications, and wherein each type of notification of the plurality of types of notifications is indicative of a different characteristic of the compute resource. For example, as discussed herein, the compute resource may comprise at least one of at least one memory of the computing device, at least one processor of the computing device, at least one network to which the computing device is communicatively coupled, or at least one storage device of the computing device. The characteristic of the compute resource may comprise at least one of an available amount of the at least one memory, a percentage of time tasks are delayed based on memory allocation time of the at least one memory meeting or exceeding a predetermined threshold (e.g., due to memory shortage and fragmentation), a first measure of processing usage of the at least one processor, a second measure of network usage associated with the at least one network, or a third measure of utilization of the at least one storage device.

In 504, degradation mitigator 322 determines a level of performance degradation, from a plurality of different levels of performance degradation, of the computing device based on a mapping of mapper 318 that maps each type of notification of the plurality of types of notifications to a corresponding level of performance degradation of the plurality of different levels of performance degradation. As discussed herein, the mapping of mapper 318 may further map the plurality of different levels of performance degradation to the plurality of different actions.

In 506, degradation mitigator 322 performs, based on the determined level of performance degradation, an action from a plurality of different actions configured to mitigate the performance degradation. For example, as discussed herein, the action may comprise at least one of causing a second notification indicative of the determined level of performance degradation to be provided to an application or service (e.g., OS component(s) 310) of operating system 302 executing on the computing device, causing at least one add-on (e.g., of add-on(s) 308) installed on the computing device to be decompiled, or causing at least one of a background application (e.g., of background application(s) 304) executing on the computing device or a foreground application (e.g., of foreground application(s) 306) executing on the compute device to be terminated.

Causing a second notification indicative of the determined level of performance degradation to be provided to an application or service (e.g., OS component(s) 310) of operating system 302 executing on the computing device may comprise calling a callback function (e.g., of callback function(s) 332) of the application or service that is registered with a first handler function (e.g., OS handler 324), wherein the callback function is configured to provide the second notification to the application or service of operating system 302. Causing at least one add-on (e.g., of add-on(s) 308) installed on the computing device to be decompiled may comprise providing a third notification to a second handler function (e.g., application component handler 328) communicatively coupled to decompiler 330, the third notification causing the second handler function to instruct decompiler 330 to decompile the at least one add-on (e.g., of add-on(s) 308). Causing at least one of a background application (e.g., of background application(s) 304) executing on the computing device or a foreground application (e.g., of foreground application(s) 306) executing on the compute device to be terminated may comprise providing a fourth notification to a third handler function (e.g., application handler 326) communicatively coupled to operating system 302, the fourth notification causing the third handler function to instruct operating system 302 to terminate at least one of the background application (e.g., of background application(s) 304) or the foreground application (e.g., of foreground application(s) 306).

In some aspects, notification receiver 320 may receive a second notification of a second type, which is indicative of another characteristic of the same compute resource associated with the first notification or a different compute resource. Degradation mitigator 322 may determine another (e.g., a different) level of performance degradation, from the plurality of different levels of performance degradation, based on the mapping of mapper 318. Degradation mitigator 322 may perform, based on the determined level of performance degradation, another (e.g., a different) action from the plurality of different actions configured to mitigate the performance degradation.

FIG. 6 is a flowchart for a method 600 for receiving a notification indicative of a characteristic of a compute resource of the computing device, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to media device 300 of FIG. 3, which is one example of a media device. However, method 600 is not limited to that example embodiment.

In 602, notification receiver 320 provides a request to an API (e.g., of API(s) 312) of OS 302 executing on the computing device (e.g., media device 300) to receive the first notification. For example, as discussed herein, notification receiver 320 registers or subscribes to API(s) 312 to receive such a notification.

In 604, notification receiver 320 receives the first notification via the API (e.g., of API(s) 312).

Example Computer System

Figure 7:
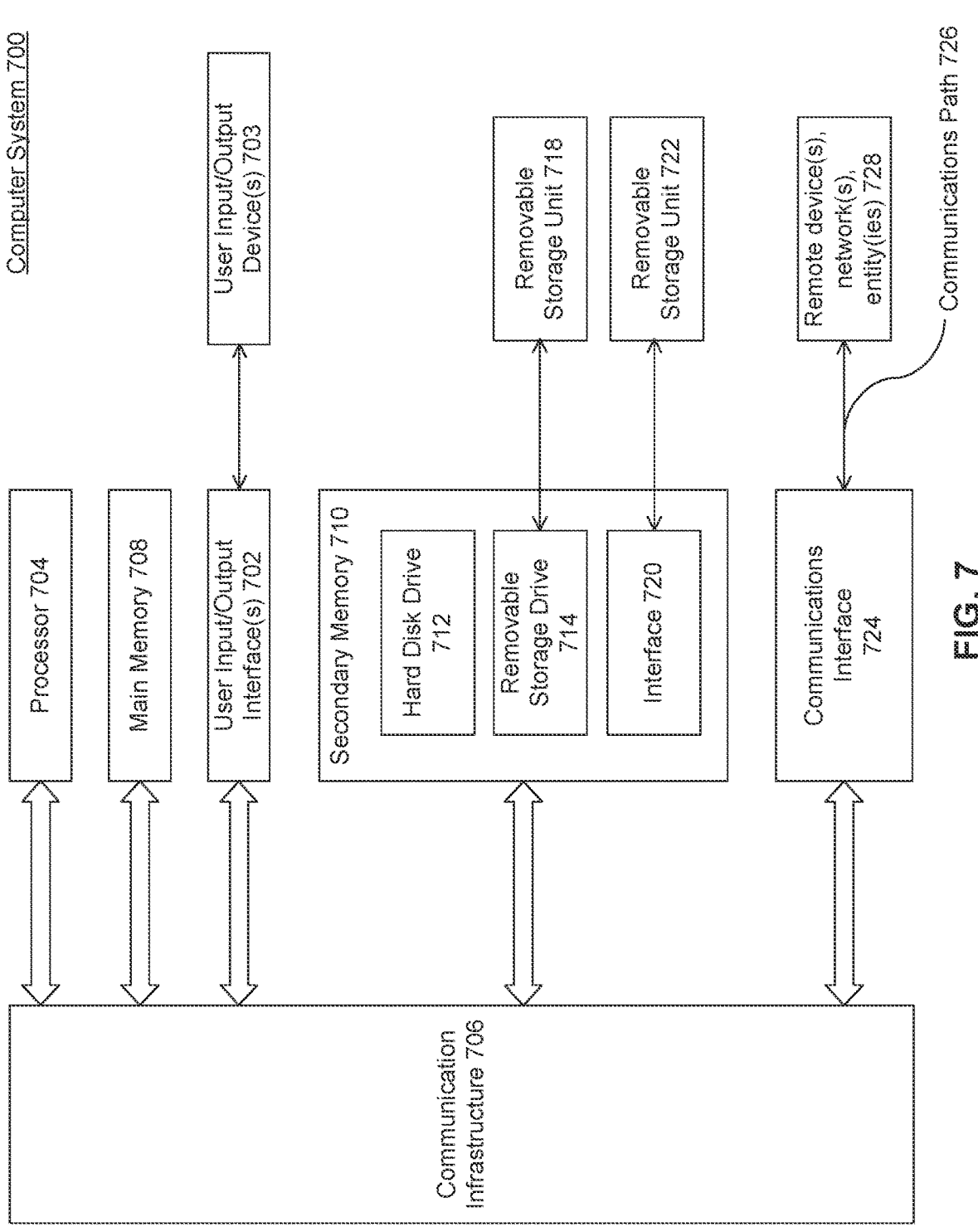
FIG. 7 illustrates an example computer system useful for implementing various embodiments.

Various embodiments may be implemented, for example, using one or more well-known computer systems, such as computer system 700 shown in FIG. 7. For example, one or more of media device 106, remote control 110, content server(s) 120, system server(s) 126, performance monitoring configuration component 128, performance degradation mitigation module 218, media device 300, configuration implementer 314, mapper 318, notification receiver 320, degradation mitigator 322, OS handler 324, application handler 326, application component handler 328, and decompiler 330 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for mitigating performance degradation of a computing device, the computer-implemented method comprising:
   receiving a first notification indicative of a characteristic of a compute resource of the computing device, wherein the first notification is of a first type of a plurality of types of notifications, wherein each type of notification of the plurality of types of notifications is indicative of a different characteristic of the same compute resource, wherein the compute resource comprises at least one or more memories of the computing device, and wherein the characteristic comprises at least a percentage of time tasks are delayed based on memory allocation time of the one or more memories;
   determining a first level of performance degradation, from a plurality of different levels of performance degradation, of the computing device based on the first notification utilizing a mapping that maps each type of notification of the plurality of types of notifications to a corresponding level of performance degradation of the plurality of different levels of performance degradation;
   causing, based on the determined first level of performance degradation, a background application executing on the computing device to be terminated;
   receiving a second notification indicative of the characteristic of the compute resource, wherein the second notification is of a second type of the plurality of types of notifications;
   determining a second level of performance degradation, from the plurality of different levels of performance degradation, of the computing device based on the second notification utilizing the mapping, wherein the second level of performance degradation is more severe than the first level of performance degradation; and
   causing, based on the determined second level of performance degradation, a foreground application executing on the computing device to be terminated.

2. The computer-implemented method of claim 1, further comprising:
   receiving a third notification indicative of the characteristic of the compute resource, wherein the third notification is of a third type of the plurality of types of notifications;
   determining a third level of performance degradation, from the plurality of different levels of performance degradation, of the computing device based on the third notification utilizing the mapping;
   causing a fourth notification indicative of the determined third level of performance degradation to be provided to an application or service of an operating system executing on the computing device; and
   causing at least one add-on installed on the computing device to be decompiled.

3. The computer-implemented method of claim 2, wherein causing the fourth notification to be provided to the application or service of the operating system comprises calling a callback function of the application or service that is registered with a first handler function, wherein the callback function is configured to provide the fourth notification to the application or service of the operating system, wherein causing the at least one add-on installed on the computing device to be decompiled comprises providing a fifth notification to a second handler function communicatively coupled to a decompiler, the fifth notification causing the second handler function to instruct the decompiler to decompile the at least one add-on, wherein causing the background application executing on the computing device to be terminated comprises providing a sixth notification to a third handler function communicatively coupled to the operating system, the sixth notification causing the third handler function to instruct the operating system to terminate the background application, and wherein causing the foreground application executing on the computing device to be terminated comprises providing a seventh notification to the third handler function to instruct the operating system to terminate the foreground application.

4. The computer-implemented method of claim 1, wherein the mapping further maps the plurality of different levels of performance degradation to a plurality of different actions.

5. The computer-implemented method of claim 1, wherein receiving the first notification comprises:

providing a request to an application programming interface (API) of an operating system executing on the computing device to receive the first notification; and receiving the first notification via the API.

6. The computer-implemented method of claim 1, wherein the compute resource further comprises at least one of:

at least one processor of the computing device;

at least one network to which the computing device is communicatively coupled; or at least one storage device of the computing device.

7. The computer-implemented method of claim 6, wherein the characteristic of the compute resource further comprises at least one of:

an available amount of the one or more memories;

a first measure of processing usage of the at least one processor;

a second measure of network usage associated with the at least one network; or a third measure of utilization of the at least one storage device.

8. A system for mitigating performance degradation, comprising:

one or more memories; and at least one processor each coupled to at least one of the one or more memories and configured to perform operations comprising:

receiving a first notification indicative of a characteristic of a compute resource of the system, wherein the first notification is of a first type of a plurality of types of notifications, wherein each type of notification of the plurality of types of notifications is indicative of a different characteristic of the same compute resource, wherein the compute resource comprises at least the one or more memories, and wherein the characteristic comprises at least a percentage of time tasks are delayed based on memory allocation time of the one or more memories;

determining a first level of performance degradation, from a plurality of different levels of performance degradation, of the system based on the first notification utilizing a mapping that maps each type of notification of the plurality of types of notifications to a corresponding level of performance degradation of the plurality of different levels of performance degradation;

causing, based on the determined first level of performance degradation, a background application executing on the system to be terminated;

receiving a second notification indicative of the characteristic of the compute resource, wherein the second notification is of a second type of the plurality of types of notifications;

determining a second level of performance degradation, from the plurality of different levels of performance degradation, of the system based on the second notification utilizing the mapping, wherein the second level of performance degradation is more severe than the first level of performance degradation; and causing, based on the determined second level of performance degradation, a foreground application executing on the system to be terminated.

9. The system of claim 8, wherein the operations further comprise:

receiving a third notification indicative of the characteristic of the compute resource, wherein the third notification is of a third type of the plurality of types of notifications;

determining a third level of performance degradation, from the plurality of different levels of performance degradation, of the system based on the third notification utilizing the mapping;

causing a fourth notification indicative of the determined third level of performance degradation to be provided to an application or service of an operating system executing on the system; and causing at least one add-on installed on the system to be decompiled.

10. The system of claim 9, wherein causing the fourth notification to be provided to the application or service of the operating system comprises calling a callback function of the application or service that is registered with a first handler function, wherein the callback function is configured to provide the fourth notification to the application or service of the operating system, wherein causing the at least one add-on installed on the system to be decompiled comprises providing a fifth notification to a second handler function communicatively coupled to a decompiler, the fifth notification causing the second handler function to instruct the decompiler to decompile the at least one add-on, wherein causing the background application executing on the system to be terminated comprises providing a sixth notification to a third handler function communicatively coupled to the operating system, the sixth notification causing the third handler function to instruct the operating system to terminate the background application, and wherein causing the foreground application executing on the system to be terminated comprises providing a seventh notification to the third handler function to instruct the operating system to terminate the foreground application.

11. The system of claim 8, wherein the mapping further maps the plurality of different levels of performance degradation to a plurality of different actions.

12. The system of claim 8, wherein receiving the first notification comprises:

providing a request to an application programming interface (API) of an operating system executing on the system to receive the first notification; and receiving the first notification via the API.

13. The system of claim 8, wherein the compute resource further comprises at least one of:

the at least one processor;

at least one network to which the system is communicatively coupled; or at least one storage device of the system.

14. The system of claim 13, wherein the characteristic of the compute resource further comprises at least one of:

an available amount of the one or more memories;

a first measure of processing usage of the at least one processor;

a second measure of network usage associated with the at least one network; or a third measure of utilization of the at least one storage device.

15. A non-transitory computer-readable medium having instructions stored thereon that, when executed by at least one computing device, cause the at least one computing device to perform operations comprising:

receiving a first notification indicative of a characteristic of a compute resource of the at least one computing device, wherein the first notification is of a first type of a plurality of types of notifications, wherein each type of notification of the plurality of types of notifications is indicative of a different characteristic of the same compute resource, wherein the compute resource comprises at least one or more memories of the at least one computing device, and wherein the characteristic comprises at least a percentage of time tasks are delayed based on memory allocation time of the one or more memories;

determining a first level of performance degradation, from a plurality of different levels of performance degradation, of the at least one computing device based on the first notification utilizing a mapping that maps each type of notification of the plurality of types of notifications to a corresponding level of performance degradation of the plurality of different levels of performance degradation;

causing, based on the determined first level of performance degradation, a background application executing on the at least one computing device to be terminated;

receiving a second notification indicative of the characteristic of the compute resource, wherein the second notification is of a second type of the plurality of types of notifications;

determining a second level of performance degradation, from the plurality of different levels of performance degradation, of the at least one computing device based on the second notification utilizing the mapping, wherein the second level of performance degradation is more severe than the first level of performance degradation; and causing, based on the determined second level of performance degradation, a foreground application executing on the at least one computing device to be terminated.

16. The non-transitory computer-readable medium of claim 15, further comprising:

determining a third level of performance degradation, from the plurality of different levels of performance degradation, of the at least one computing device based on a third notification utilizing the mapping;

causing a fourth notification indicative of the determined third level of performance degradation to be provided to an application or service of an operating system executing on the at least one computing device; and causing at least one add-on installed on the at least one computing device to be decompiled.

17. The non-transitory computer-readable medium of claim 16, wherein causing the fourth notification to be provided to the application or service of the operating system comprises calling a callback function of the application or service that is registered with a first handler function, wherein the callback function is configured to provide the fourth notification to the application or service of the operating system, wherein causing the at least one add-on installed on the at least one computing device to be decompiled comprises providing a fifth notification to a second handler function communicatively coupled to a decompiler, the fifth notification causing the second handler function to instruct the decompiler to decompile the at least one add-on, wherein causing the background application executing on the at least one computing device to be terminated comprises providing a sixth notification to a third handler function communicatively coupled to the operating system, the sixth notification causing the third handler function to instruct the operating system to terminate the background application, and wherein causing the foreground application executing on the at least one computing device to be terminated comprises providing a seventh notification to the third handler function to instruct the operating system to terminate the foreground application.

18. The non-transitory computer-readable medium of claim 15, wherein the mapping further maps the plurality of different levels of performance degradation to a plurality of different actions.

19. The non-transitory computer-readable medium of claim 15, wherein receiving the first notification comprises:

providing a request to an application programming interface (API) of an operating system executing on the at least one computing device to receive the first notification; and receiving the first notification via the API.

20. The non-transitory computer-readable medium of claim 15, wherein the compute resource further comprises at least one of:

at least one processor of the at least one computing device;

at least one network to which the at least one computing device is communicatively coupled; or at least one storage device of the at least one computing device.

* * * * *